US012142186B2

(12) United States Patent
Sweeney et al.

(10) Patent No.: US 12,142,186 B2
(45) Date of Patent: Nov. 12, 2024

(54) DISPLAY SCREEN

(71) Applicant: Microsoft Technology Licensing, LLC, Redmond, WA (US)

(72) Inventors: David Anthony Sweeney, London (GB); Stephen Edward Hodges, Cambridge (GB); Nicholas Yen-Cherng Chen, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/767,878

(22) PCT Filed: Oct. 16, 2020

(86) PCT No.: PCT/US2020/055870
§ 371 (c)(1),
(2) Date: Apr. 8, 2022

(87) PCT Pub. No.: WO2021/080854
PCT Pub. Date: Apr. 29, 2021

(65) Prior Publication Data

US 2024/0087497 A1 Mar. 14, 2024

(30) Foreign Application Priority Data

Oct. 25, 2019 (EP) .................................... 19205496

(51) Int. Cl.
*G09G 3/20* (2006.01)
*G09G 3/00* (2006.01)
*G09G 3/34* (2006.01)

(52) U.S. Cl.
CPC ........... *G09G 3/2088* (2013.01); *G09G 3/035* (2020.08); *G09G 3/344* (2013.01); *G09G 2320/0693* (2013.01); *G09G 2340/00* (2013.01); *G09G 2360/142* (2013.01); *G09G 2370/18* (2013.01)

(58) Field of Classification Search
None
See application file for complete search history.

(56) References Cited

U.S. PATENT DOCUMENTS

2010/0053040 A1 3/2010 Nishi et al.
2011/0050658 A1 3/2011 White et al.
2013/0328925 A1 12/2013 Latta et al.
2016/0035314 A1 2/2016 Pan
(Continued)

OTHER PUBLICATIONS

"Search Report Issued in European Application No. 19205496.3", Mailed Date: Jul. 6, 2020, 15 Pages.
(Continued)

*Primary Examiner* — Nicholas J Lee
(74) *Attorney, Agent, or Firm* — Barta Jones, PLLC

(57) ABSTRACT

There is provided a display screen configurable via optical signals to display an image. The display screen is formed of an optical waveguide having a display surface and supporting a plurality of pixels for displaying the image on the display surface of the optical waveguide. The optical waveguide is arranged to guide a multiplexed signal in optical form to a plurality of pixel controllers, each coupled to at least one of the pixels and configured to demultiplex the multiplexed signal and thereby extract a component signal associated with the at least one pixel for controlling it to render an element of the image.

20 Claims, 6 Drawing Sheets

(56) References Cited

U.S. PATENT DOCUMENTS

| | | | |
|---|---|---|---|
| 2016/0307521 | A1 | 10/2016 | Sweeney et al. |
| 2017/0205889 | A1 | 7/2017 | Ng et al. |

OTHER PUBLICATIONS

"International Search Report and Written Opinion Issued in PCT Application No. PCT/US20/055870", Mailed Date: Feb. 3, 2021, 16 Pages.

Communication pursuant to Article 94(3) Received in European Patent Application No. 20800769.0, mailed on Aug. 14, 2024, 9 pages.

DISPLAY SCREEN

TECHNICAL FIELD

The present disclosure relates to a display screen configurable to display an image.

BACKGROUND

Displays known in the art are generally flat and rigid, comprising matrix-connected pixel topology. That is, the pixels are arranged in a rectangular gird, the pixels being connected by wires (electrical connectors) in rows and columns. A controller coupled to the grid can address control signals to particular pixels in the grid. Alternatively, pixels or display segments may be shaped or arranged arbitrarily, the pixels or segments connected to a controller via tracks. This type of display is called a segmented display. The fragile tracks require the display to be rigid. Some modern displays are comprised of a transparent plastic substrate, such as polyethylene terephthalate (PET). The rectangular grid of pixels is situated on this substrate.

Transistors may be used to control the state of each pixel. The states may be binary, such as on/off states, or they may be non-binary, such as defining a colour to be emitted by the pixel when a pixel is capable of emitting different colours. An "active" pixel herein means a pixel that requires continuous power in order to render a desired colour via emission of visible light. A "passive" pixel, such as an electrophoretic pixel, has configurable reflective properties and only requires power to change its reflective properties e.g. from white (relatively reflective) to black (relatively absorbent) or vice versa; no power is required for as long as the pixel remains in a given reflective state. For example, a simple e-ink display may have an array of binary (black/white) pixels and a computer-generated bit map may define an image to be displayed. The bit map may be used to control a transistor associated with each pixel, so as to control the state of each pixel of the display. The pixels may be addressed using their location in the rectangular gird. Typically, the pixels are ordered in the grid by address, i.e. there is a known mapping between pixel locations and pixel addresses, and the latter is dependent on the former.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

A problem with matrix-connected pixel topologies is that the connecting wires are fragile. This typically limits applications to rigid or reasonably inflexible display screens. Flexible displays comprising such matrix-connected pixels are possible, but can only be flexible within strict limits and requires careful handling so as not to damage the fragile wire. This is, therefore, not practical for displays which are to be re-shaped frequently by users. Another problem is that such grids restrict the design capabilities of the displays: once a display screen has been manufactured, it is not typically possible to modify the structure/physical configuration of the display screen without damaging the pixel grid. For example, severing or otherwise breaking the electrical connection of a wire in the grid will typically cause an entire row/column of pixels to no longer function, as they are no longer able to receive control signals. Therefore, such display screens have to be designed in a way that minimized the risk of this, which typically necessitates a rigid and non-configurable design.

The present disclosure provides a novel form of display screen which removes the need for the fragile and restrictive wire grid.

A first aspect of the present disclosure provides a display system comprising: a display screen configurable via optical signals to display an image, the display screen formed of an optical waveguide having a display surface and supporting a plurality of pixels for displaying the image on the display surface of the optical waveguide, each pixel of the plurality of pixels has an assigned pixel address, the plurality of pixels being randomly arranged in that each pixel address is independent of the pixel's location, the optical waveguide arranged to guide a multiplexed signal in optical form to a plurality of pixel controllers, each coupled to at least one of the pixels and configured to demultiplex the multiplexed signal and thereby extract a component signal associated with the at least one pixel for controlling it to render an element of the image; an input configured to receive an image to be rendered; an image processing component, the image processing component configured to: accesses a memory in which assigned addresses of the pixels are stored associated with the locations of the pixels on the display screen, the location of each pixel determined in a calibration process; identify any two or more pixels of the display screen which have the same pixel address; based on the received image to be rendered, determine if the two or more pixels with the same assigned pixel address are required to render different colours; and if it is determined that the two or more pixels are required to render different colours: compile a transformed version of the image using image processing applied to the image such that the two or more pixels are no longer required to render different colours; wherein a display controller is configured to generate a multiplexed signal in optical form to cause the display screen to display the transformed version of the image.

A second aspect provides a display system comprising the present display screen; an input configured to receive an image to be rendered; and a display controller coupled to the optical waveguide of the display screen and configured to generate a multiplexed signal in optical form to cause the display screen to display the received image or a version of the received image.

The phrase "image displayed on a display surface" and the like is used as a convenient shorthand to mean that the image is perceptible to a user viewing the display surface. The pixels causing the image to be visible can be mounted on the display surface, but also on the opposing surface of the waveguide such that light emitted/reflected from the pixels passes through the waveguide to render the image visible. The pixels may alternatively be suspended in the waveguide. The terminology does not preclude the presence of a transparent/opaque layer on the display surface of the waveguide.

BRIEF DESCRIPTION OF THE DRAWINGS

To assist understanding of the present disclosure and to show how embodiments of the present disclosure may be put into effect, reference is made by way of example to the accompanying drawings, in which.

DETAILED DESCRIPTION

Figure 1:
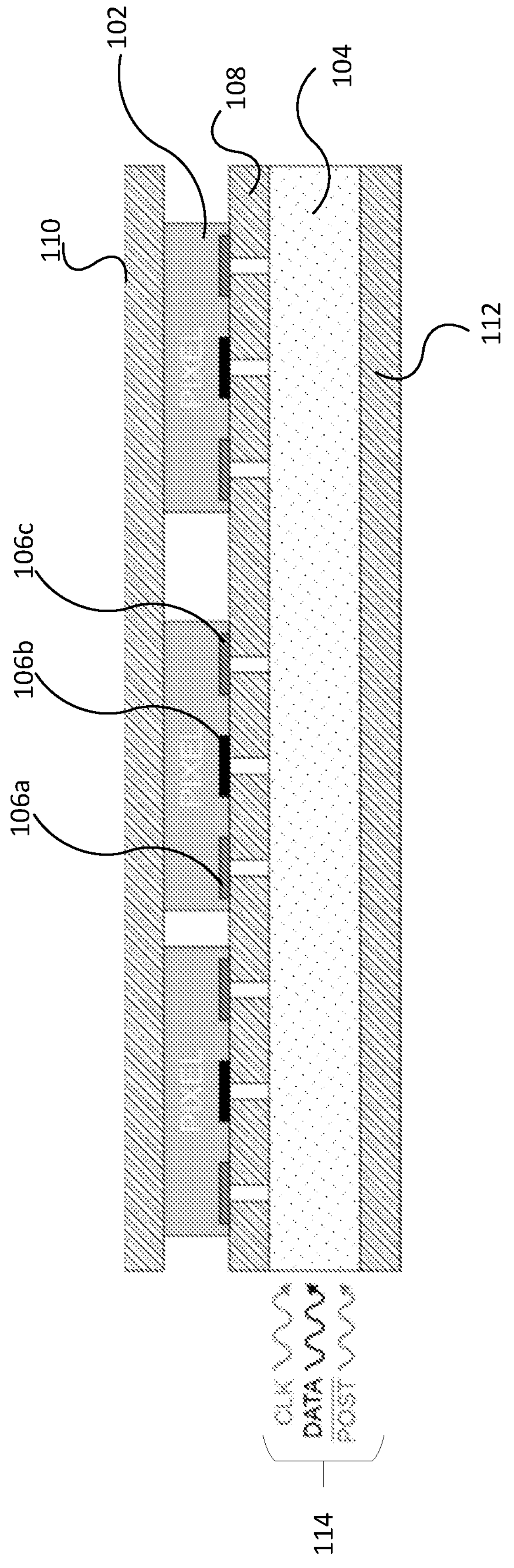
FIG. 1 shows an example display screen.

The described embodiments provide a display which is controlled by optical signals broadcast (or, more generally, multicast) to all (or at least some) pixels of the display, the optical signals being transported to the pixels via an optical waveguide on or in which the pixels are supported. An image to be displayed is defined, and the optical signals transported to the pixels define a state of each pixel of the display using a suitable multiplexing scheme. The multiplexing scheme multiplexes control messages based on pixel addresses e.g. using time-division multiplexing (TDMA) in which pixel addresses are included as frame header bits (address portion) and control messages are included as payload bits (control portion), or code division multiplexing in which control messages are multiplexed using pixel addresses as multiplexing codes. This facilitates the design of flexible displays, for example.

The described display screen uses light sensitive pixels. Each pixel of the display has its own capabilities built in for sensing and signalling on the shared optical waveguide, by way of an integrated pixel controller coupled. Each pixel acts independently of its neighbours. Such pixels may be referred to as autonomous pixels as there is no requirement for them to be connected in a network with each other. When light is incident on the light sensor of an autonomous pixel, it can cause a pixel to change colour, by varying its reflective or emissive properties. The light sensors may face forwards, such that light shone onto the emitting side of the sensor determines the state of the pixel. For example, in known applications of autonomous pixels, a torch or projector may be used to define the displayed image. Alternatively, the sensors may be rear facing, such that light shone on the side of the pixels which do not emit determines the image to be display. The intensity of the incident light determines whether the pixel is activated. These sorts of displays are preferably used when the image to be displayed is displayed for a prolonged period of time.

Further details of an autonomous pixel architecture that may be used in the present context may be found in US patent application US2016307520, which is incorporated herein by reference in its entirety.

In the present examples, optical control signals are provided to multiple autonomous pixels via an optical waveguide substrate supporting the pixels.

Hence, the described embodiment provides an improved flexible display by removing the need to apply incident light to the display in the shape of the desired display. The flexible displays discussed above require either some mechanism for moving the light source, or the material to be returned to a fixed light source when the image displayed on the flexible display is to be changed. In some situations, this is not suitable for displays which are to be used for frequently changing display images. Additionally, there may be a problem with occlusion. There may be self-occlusion, wherein the display surface occludes itself, or external bodies may occlude the surface, such that the imaging light, that is the light used to alter the emissive properties of the pixels, is not incident at the desired location on the display, or on the desired pixels.

Such flexible displays may be comprised of an electrophoretic display (EPD) front plane which is laminated onto a PET plastic film. The EPD only requires power when the pixel state is changing. That is, the display captures a ‘snapshot’ of the light incident upon it when powered.

Since the pixels are autonomous, they do not need to be connected to each other. Additionally, their arrangement on the substrate does not need to be known. The pixels may, therefore, be applied to the substrate in an unordered fashion. In the present disclosure, the location of the pixels does need to be known. However, the pixels can be located using a calibration process as described later. As such, the pixels can still be applied in an unordered fashion.

The state of the pixels can be controlled by optical signals which are broadcast to some or all of the pixels in the display. The pixels are able to convert the optical signal into electrical signals and then implement the state defined by the electrical signal if the signal is addressed to that specific pixel.

The optical signals are transmitted through an optical waveguide which is common to all pixels of the display. The optical waveguide also supports the pixels. The PET substrate used in some modern displays could be used for this optical waveguide, so providing a cheap and flexible option for the waveguide material. Other clear plastic materials would also be suitable for use as the optical waveguide.

Some modern displays use glass as the substrate. A glass substrate may be used as the optical waveguide in the present disclosure. However, this will not provide a flexible display, nor is it easily cut to form the desired shape of the display, unlike flexible plastics.

FIG. 1 shows a schematic diagram of an example display screen. The display screen comprises a stack of layers of elements. The stack shown in FIG. 1 comprises pixels 102, an optical waveguide 104, colour p-diodes **106*a*, 106*b*, 106*c*, a power conductor 108, a common electrode 110, and a ground 112**.

The pixels 102 are supported by the optical waveguide 104. In FIG. 1, three pixels 102 are shown, the pixels being the same size. However, there may be any number of pixels on the optical waveguide 104 and their shapes and sizes may vary.

Each pixel 102 of the display is associated with one or more colour p-diodes **106*a*, 106*b*, 106*c*. Alternatively, phototransistors with a colour filter or some other sensor with a colour narrow band sensitivity could be used. The colour p-diodes 106*a*, 106*b*, 106*c* or alternatives are the input sensors to the pixels. They each detect a different one of the signals 114 transmitted on the optical waveguide 104**, each different signal having a different wavelength.

The power conductor 108, common electrode 110, and ground 112 are used to supply the pixels with the power they require to change state, and are common to all of the pixels of the display such that the power planes are shared. It will be appreciated that this is only one of many possible arrangements for providing power to the pixels. The display screen may comprise one or more power converters, which draw power from the optical signals transported by the optical waveguide 104 to power the pixels 102. Each power converter may be associated with a single pixel 102 such that each pixel harvests its own energy, or it may be associated with multiple pixels 102. Although not shown in FIG. 1, there is also a via through the optical waveguide 104 so that each pixel 102 can connect to the common ground 112.

The state may be a binary on/off state, or it may be a non-binary state. Colour is a product of blending different emitters/reflectors that can have a continuous rather than discrete control.

Whether the pixels are constantly supplied with power or only supplied with power intermittently may depend on the use of the display. The pixels 102 only require power to change state. If the image to be displayed on the display is changing frequently, for example, if a film or some other video is being displayed, the pixels will require continuous power in order to change state continuously. However, if the display is used to display an image for a prolonged period of time, for example displaying a still image, the pixels only need to be supplied with power when the image to be displayed is changed, i.e. intermittently.

In FIG. 1, a display surface of the display screen is the top side of the common electrode 110. That is, it is the side of the common electrode 110 which is not in contact with the pixels 120. In some embodiments, the display surface may be an exposed surface of the optical waveguide itself. In such an embodiment, the optical waveguide 104 would form the top layer of the stack comprising the display screen. It will be appreciated that the material used for the layer comprising the display surface of the stack, that is, the material through which the pixels are viewed, must be transparent.

In an alternative embodiment, the pixels 102 are embedded within the optical waveguide 104.

The waveguide 104 may comprise a layer of PET. PET is used as a substrate in modern displays. It is cheap, readily available, and flexible. The use of PET as the optical waveguide 104 contributes to the ability of the display to be both scalable and flexible. Although the example of PET is used herein, it will be appreciated that other flexible plastics may also be used for the optical waveguide 104.

The optical waveguide 104 is used to transport a multiplexed optical signal 114 to the pixels 102 supported by the optical waveguide 104. The signal 114 are broadcast to all of the pixels 102 of the waveguide 104.

FIG. 1 shows three types of signals 114: a 'clock' signal (CLK), a 'data' signal (DATA), and a 'post' signal (POST). It will be appreciated that this is just one possible set of signals 114 which can be transmitted via the optical waveguide 104 and that other signals may be transmitted to the pixels 102 via the optical waveguide 104.

Each type of signal has a different wavelength. Each pixel 102 comprises one or more light sensors. The light sensors may be sensitive to different wavelengths of light, such that each different signal type is detectable by a different sensor of the pixel 102. That is, wavelength-division multiplexing, as known in the art, is used. This increases the capacity of the optical waveguide 104, such that a larger number of signals 114 may be transmitted simultaneously. This also decreases the complexity of the pixel demultiplexer as the clock signal does not have to be extracted from the datastream.

The bandwidth of the display may be increased by introducing additional waveguides 104 in parallel.

The multiplexed optical signals 114 may be visible light. Optical signals 114 which are in the visible spectrum may be used if the optical waveguide 104 is situated behind the pixels 102. However, if the optical waveguide 104 is the top layer of the display stack, that is, it sits on top of the pixels 102 and the displayed image is viewed through the optical waveguide 104, the optical signals 114 may be infrared light, such that the signals 114 are not visible. It will be appreciated that other wavelengths may be used for transmitting the signals 114.

All of the pixels 102 of the display receive signals 114 of the same type on the same frequency. That is, the frequency of a signal 114 is not specific to the pixel 102 by which it is intended to be implemented. Instead, all pixels 102 receive all signals 114.

The multiplexed optical signals are generated by one or more display controllers, as referred to herein as signal transmitters. The display controllers receive an image to be rendered on the display. The display controller accesses a database of pixel locations and addresses and determines a required state of each pixel of the display screen such that the image can be rendered on the display screen. Once the pixel address and required state are known, the display controller generates the multiplexed optical signal 114 which, when received by the pixels 102, causes the image to be rendered on the display screen. The display controllers are coupled to the optical waveguide 104 and transmit the multiplexed optical signal 114 into the waveguide 104.

The multiplexed optical signals 114 are broadcast to all pixels 102 of the display screen, such that all pixels 102 receive the transmitted signals 114. In some embodiments, the size of the display screen may result in the optical signals 114 attenuating such that they are not received by every pixel 102 of the display screen. In large displays where such attenuation may occur, multiple signal transmitters are used to broadcast signals 114. These transmitters are positioned such that all pixels 102 of the display can receive at least one set of transmitted signals 114.

Figure 5:
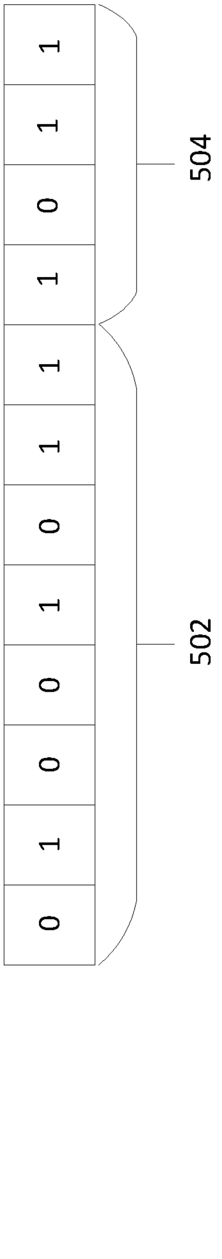
FIG. 5 shows an example signal component of a multiplexed signal.

The data signal is used to alter the state of a particular pixel 102 of the display. FIG. 5 shows an example of a data packet transmitted as the data signal. The data packets are component signals of the multiplexed optical signal 114 and are themselves time multiplexed. The example data packet of FIG. 5 is 12 bits long. There are eight address bits 502 and four control bits 504, although any number of bits may be used as discussed later. The address bits 502 are used to identify the specific bit 102 of the display which is to implement the command determined by the control bits 504. The control bits 504 define the intended state of the pixel 102. For example, the control bits 504 define if the pixel 102 is on or off and the colour of the light to be emitted by the pixel 102. The control bits 504 may also be referred to as colour bits. The address bits 502 and control bits 504 define a frame. This frame may be considered a "pixel frame". That is, it is only used to update a single pixel. This differs from a traditional display frame in which all pixels of the display are updated simultaneously.

Figure 2:
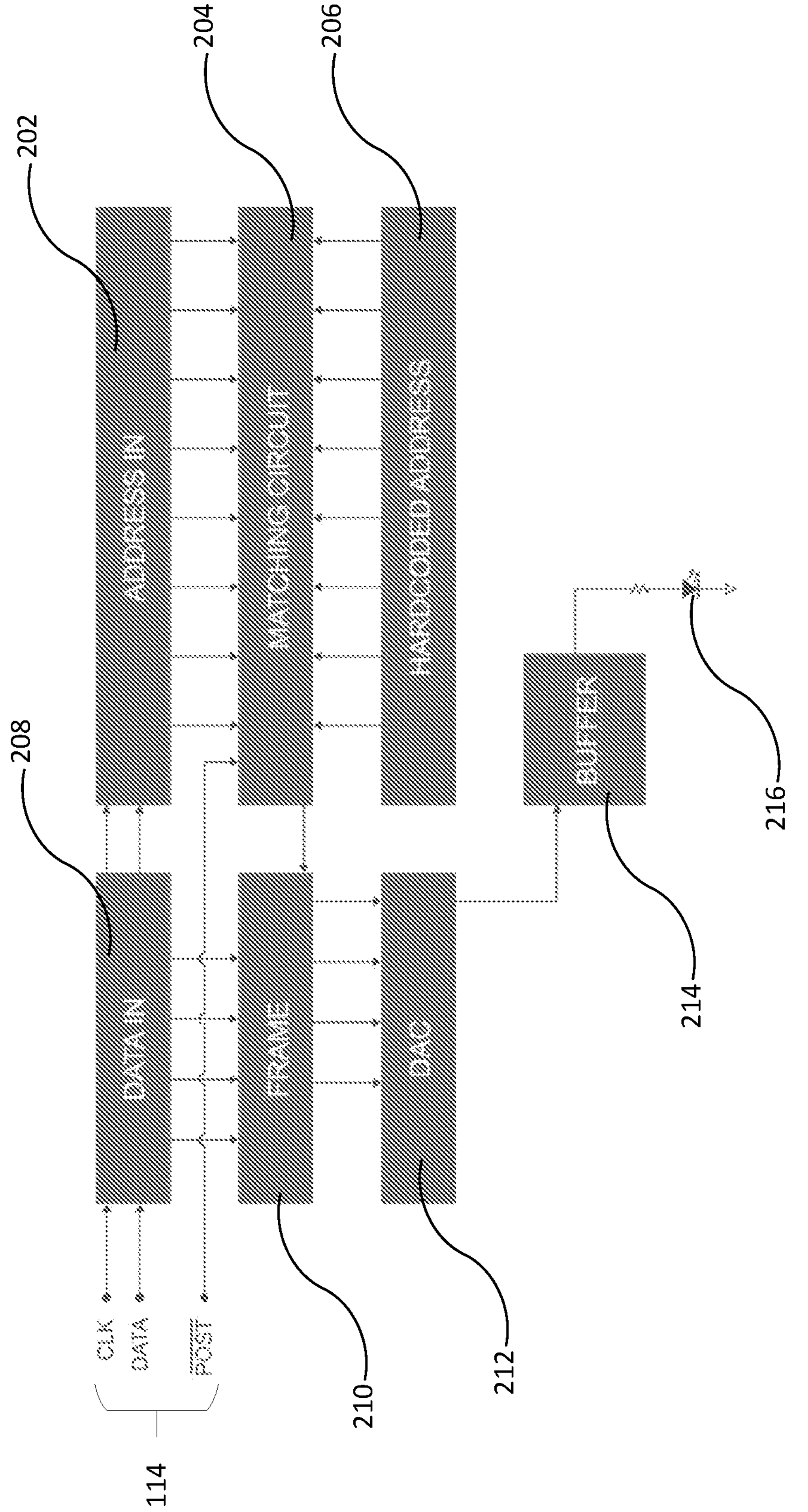
FIG. 2 shows a schematic block diagram of a pixel.

FIG. 2 shows a schematic block diagram of an example autonomous pixel 102.

The multiplexed optical signals 114 are received by the at least one pixel controller (not shown), each pixel controller coupled to at least one pixel. The pixel controller(s) demultiplex each received optical signal 114 to extract a component signal. The pixel controller may comprise an optically sensitive transistor, which may comprise, for example, a transistor and an optical filter. In some embodiments, each pixel controller is coupled to a single pixel. In other embodiments, a single pixel controller may provide control signals to multiple pixels.

The pixel 102 comprises address in circuitry 202, a hardcoded address 206 and matching circuitry 204. These elements are used to determine if a received data signal is to be implemented by the receiving pixel 102. The data signal, as shown in FIG. 5, is received by the pixel 102. When the address bits 502 are aligned with the address in circuitry 202, the matching circuitry 204 'checks' the address bits 502 against the hardcoded address 206. The check is initiated by the receival of the post signal. If the address bits 502 and the hardcoded address 206 match, the data signal is intended to be implemented by the pixel 102.

When the address bits 502 are aligned with the address in circuitry 202, the control bits 504 are aligned with data in circuitry 208, also a component of the pixel 102. If it is found that the address bits 502 match the hardcoded address 206, the control bits 504, now present in the data in circuitry 28, are pushed to frame circuitry 210, and then to a digital-to-analogue converter (DAC) 212. The DAC 212 converts the control bits 504 into an analogue signal with is transmitted to an LED 216 via a buffer 214.

Each pixel 102 can be constructed using standard CMOS transistor logic, which is known in the art.

Figure 3:
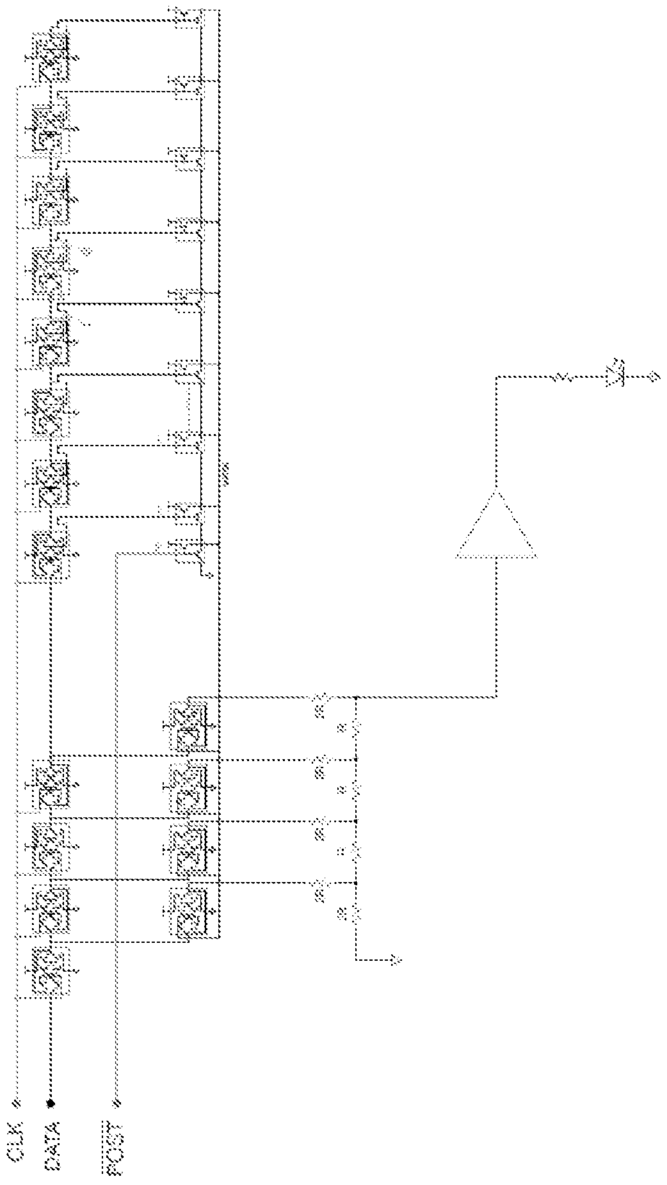
FIG. 3 shows an example implementation of a non-binary state pixel.

FIG. 3 shows an example implementation of the pixel described with reference to FIG. 2. The pixel 102 can be seen to comprise eight address bits and 4 data in bits. This corresponds to the number of address bits 502 and control bits 504 of the data signal. It will be appreciated that the pixel may comprise any number of address and data bits. The length of the data signals is determined by the construction of the pixels 102.

Each pixel 102 of the display screen is assigned a pixel address, which corresponds to the hardcoded address 206. The number of bits in the pixel address is equal to the number of address bits 502 of the data signal. The assigned pixel address is the same length for all pixels of the display. The length of the pixel address may be determined by the number of pixels 102 on the display. It may be advantageous to have more possible pixel addresses than there are pixels 102 on the display. However, it is not necessary and image processing, as described later, may be used to compensate for any pixels with matching addresses. The number of pixels 102 on a display is a trade-off between the definition of the display and the size of the pixels 102. Smaller pixels 102 result in a higher definition display but cannot support long pixel addresses due to lack of space in the pixel 102 itself.

Larger displays generally require more pixels 102 than smaller displays. As such, a larger number of pixel addresses are required. This can be achieved by increasing the number of address bits 502 and the size of the address in circuitry 202. The pixels 102 may, for example, have a pixel address 32 bits long.

The address of each pixel is hardcoded at manufacture. Each pixel is randomly assigned a pixel address. In some instances, there may be more than one pixel on a single display with the same pixel address. However, the probability of the pixels 102 with matching addresses being located next to each other is vanishingly small, particularly with longer pixel addresses.

The number of colour bits 504 and size of the data in circuitry 208 and frame circuitry 210 may be defined by the required possible states of the pixel 102. That is, the more states the pixel 102 is required to be able to enter, for example, the number of colours it is required to be able to emit, the more colour bits 504 the data signal will be required to have.

Figure 4:
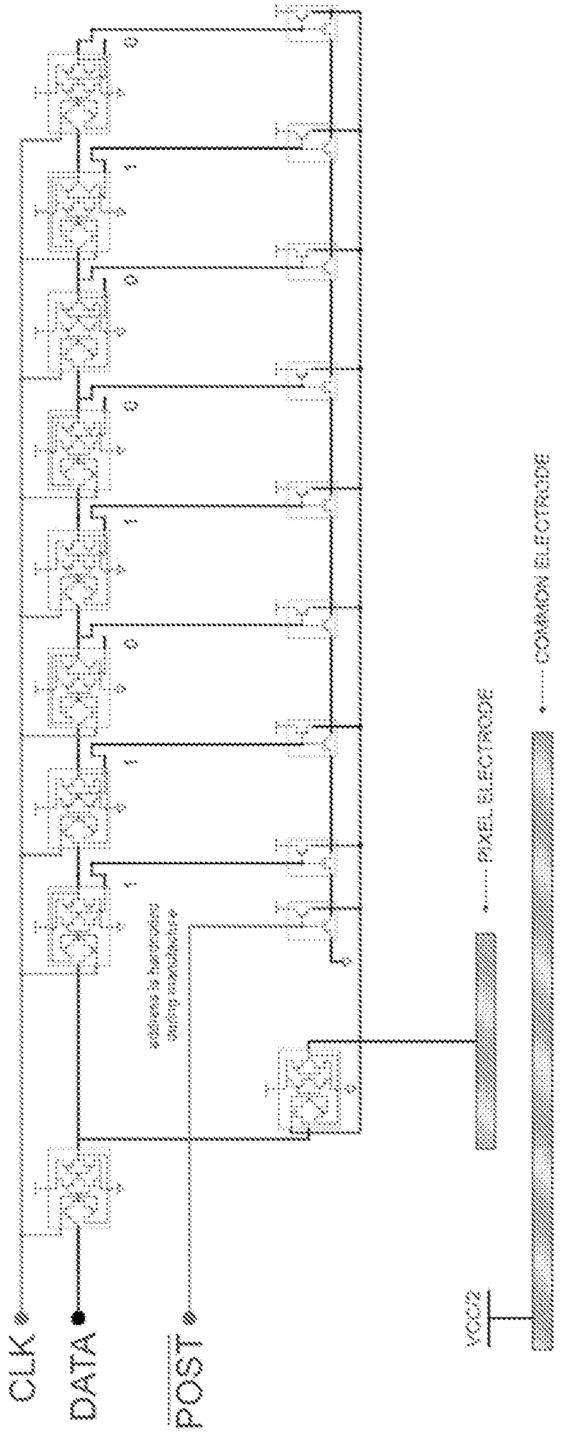
FIG. 4 shows an example implementation of a binary state pixel.

FIG. 4 shows an example of an on-off pixel 102. This sort of pixel may be used for e-paper type materials know in the art. The pixels 102 shown in FIG. 4 have a binary state of either on or off. They are not capable of emitting different colours. The pixel 102 of FIG. 4 has an 8-bit address. However, it only has a single state bit (the data in circuitry 208 as shown in FIG. 2). This is because the pixel 102 can only be on or off.

The multiplexed optical signals 114 may be transmitted continuously, such that the subsequent signals are not distinguishable from each other by only observing one signal type. For example, data signals may be transmitted continuously, such that the component signals received are a string of 1s and 0s without any features defining where one frame ends and the next beings. The post signal is used to indicate when a full data packet has been received. That is, the post signal is received by the pixels 102 when the address bits 502 of the data packet are aligned with the address in circuitry 202 and the control bits 504 are aligned with the data in circuitry 208, so indicating that a full data packet has been received by the pixel controller and initiating the address matching check. The post signal effectively acts to distinguish data packets from each other and to define when pixels 102 are updated.

The clock signal is used by the pixel circuitry to shift the bits in the circuitry, as is known in the art. The clock signal is a global signal. That is, the clock signal is the same for all signal transmitters. This ensures that all pixels 102 of the display are in phase.

The pixels 102 may be applied to the optical waveguide 104 in a post-process manufacturing stage. That is, the pixels 102 may be applied after the waveguide 104 has been cut into the desired shape of the display.

Since the pixels 102 are not connected to each other via wires, and they do not need to be arranged in a predefined array, the pixels 102 can be applied to the optical waveguide 104 via a random process. For example, the pixels 102 may be applied by spraying or rolling the pixels 102 onto the waveguide 104. The pixels 102 do not need to be arranged in an ordered manner. The pixels 102 can, therefore, be any shape, and the pixels 102 of the display do not need to be the same shape as each other. The size of the pixels 102 may be determined by the size of the resultant display and any circuitry required to construct the pixel 102.

The absence of wires connecting the pixels 102 also means that, after the pixels 102 have been applied to the waveguide 104, the waveguide 104 can be cut or otherwise shaped to form the required shape of the display screen without effecting the ability of the pixels 102 to function. In state-of-the-art displays using grids of pixels, the material cannot be cut after the pixels 102 are applied since this would cut wires to some of the pixels, thus removing capability of the pixels 102 of receiving signals.

An additional benefit of the absence of the wire grids in state-of-the-art displays is that the display can be flexible. The wire grids used are both rigid and fragile, so do not allow for the display to be bent in an extreme fashion or moulded after the pixel grids been applied to the substrate.

Moreover, the transmission of signals via an optical substrate allows for the display to be a modular display. That is, the display may be formed of two or more display screen stacks or modules, which themselves could be used as individual display screens, which are adjoining. Provided the optical waveguides 104 of each stack are aligned in the plane in which the optical signals are travelling, the signals may pass from one display screen module to another, so allowing a single image to be displayed on the modular display screen without requiring any hard connections between the modules.

As the pixels can be applied randomly, some form of calibration is required in order to locate each individual pixel 102 on the display. A calibration component is provided which is configured to perform the calibration process.

The calibration component instigates a calibration optical signal to the pixels of the display screen. The calibration optical signal identifies a pixel 102 and desired state of the pixel. The calibration component generates a calibration optical signal for every possible pixel address as defined by the number of address bits of the pixels of the display screen. The calibration component must generate a calibration signal for each possible pixel address since it is not known prior to calibration which pixel addresses have been assigned to the pixels 102 of the display screen.

The calibration optical signals are generated by the display controllers and transported to the pixels 102 via the optical waveguide 104.

Two possible calibration processes will now be described.

Calibration of the pixels 102 may be performed by triangulating or back mapping. One or more triangulation sensors are coupled to the optical waveguide. When the pixels 102 receive the calibration signal, the pixel 102 addressed by the calibration signal changes state such that it emits light. The light emissions propagate through the optical waveguide 104 to the triangulation sensors, where they are received. The calibration component determines, based on the received light emissions, the location of the address pixel in the display screen. The location and pixel address are then stored in a database.

Alternatively, calibration of the pixels 102 may be performed using line-of-sight and being able to measure small angles. The one or more triangulation sensors discussed above may be replaced with time-of-flight sensors. The time taken for the light emitted by the pixel 102 on receiving the signal 114 to be received at the time-of-flight sensors is measured and used to locate the pixel 102 in the display screen. The time-of-flight sensors are synchronised such that they know when the pixel 102 emitted the light, so can determine the time take to receive the emitted light. The location of the pixel 102 in the display screen is stored in association with the pixel address comprised in the implemented signal 114 in the database. If the display screen is a complex curved surface in 3D space, three or more time-of-flight sensors may be needed. However, if the display screen is not curved or not a complex curve, calibration using two time-of-flight sensors may be possible.

Alternatively, external calibration may be performed. An external image capturing device, such as a camera, is positioned to capture the display screen. The camera captures an image of the display screen after the calibration signal has been implemented by the pixels 102. The captured image is then used to find the location of the pixel 102 defined by the address bits 502 of the transmitted calibration signal. The determined location is stored in association with the pixel address.

The locations and pixel addresses of the display screen may be stored in a lookup table.

The calibration process may systematically test all unique pixel addresses which are possible given the number of address bits 502. In this way, the location of all pixels 102 of the display can be found. The in-situ calibration process only needs to be performed once since the mapping between the unique pixel addresses and the physical location of the pixels 102 on the display are stored.

Each possible pixel address may be tested discretely. Alternatively, if the colour capabilities of the pixels allow, multiple pixels 102 of the display may be tested simultaneously. For example, a single pixel address may be associated with each of the possible colours, such that the location of each colour, and so the pixel emitting the colour, can be identified simultaneously.

Figure 6:
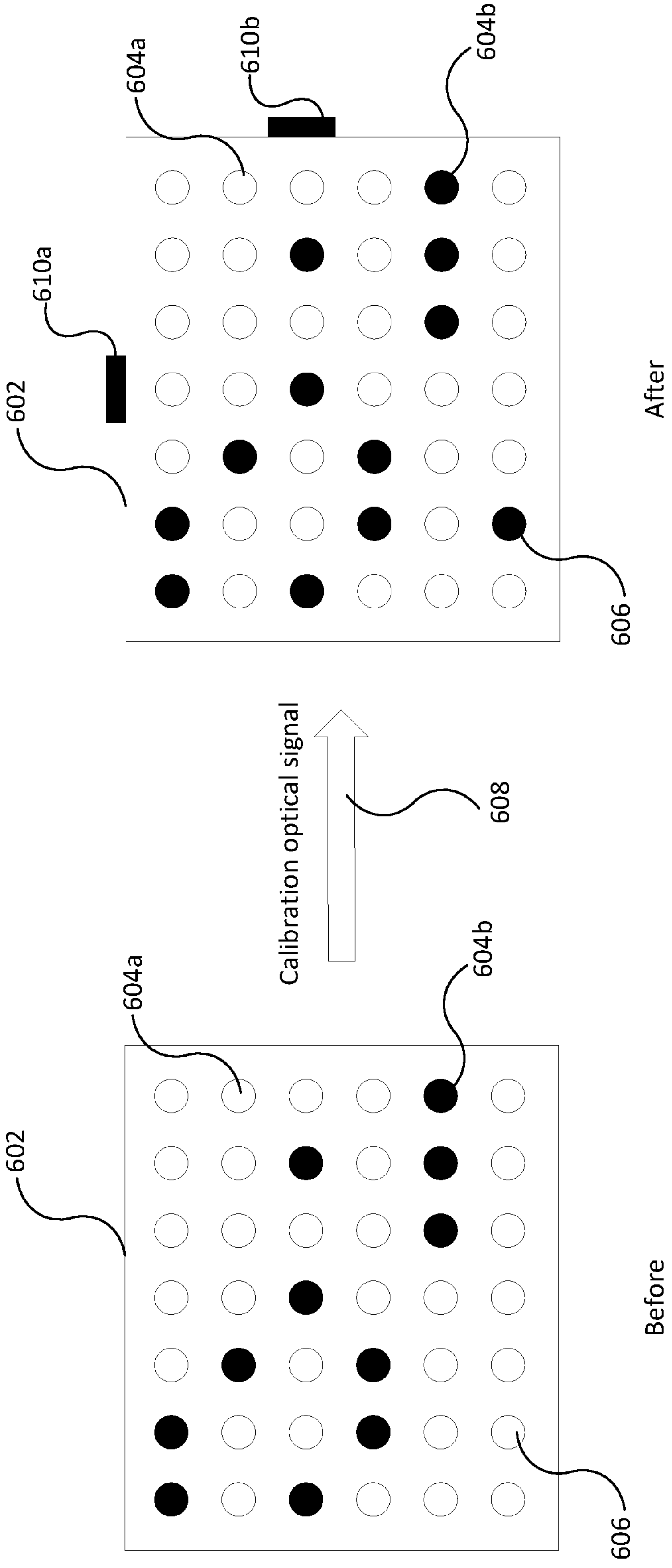
FIG. 6 shows a schematic diagram of an example calibration process.

FIG. 6 shows a schematic diagram for illustrating the example of calibration processes.

Two display screens 602 are shown. The left-hand side display screen 602 shows the display screen 602 before receiving a calibration optical signal 608. The right-hand display screen 602 shows the display screen 602 after the calibration optical signal 608 has been received and the command implemented.

The display 602 comprises pixels 604*a*, 604*b*. The display 602 shown in the example of FIG. 6 is a binary type display 602, such that each pixel 604*a*, 604*b* is either black or white. This type of display may be used, for example, in e-paper, where the reflective properties of the pixels are altered to implement a change from white to black.

Prior to the calibration process, all pixels 604*a*, 604*b* are set to white. A series of calibration optical signals is then applied to the display 602. These are generated by the calibration component for testing the response of the pixels 604*a*, 604*b* of the display screen 602 to different pixel addresses, such that the pixel address of each pixel 604*a*, 604*b* can be found.

The signals may be generated and tested in a logical order. For example, the calibration component may generate a first calibration signal addressing the lowest possible pixel address, then a second calibration signal addressing the second lowest pixel address and so on, until a calibration signal has been generated for all of the possible pixel addresses in a sequential order. Alternatively, the series of calibration signals may be generated randomly.

It can be seen that, before the calibration optical signal 608 of FIG. 6 is received, there are 11 black pixels 604*b*, and 31 white pixels 604*a*. That is, 11 calibration signals have already been implemented by the display screen 602.

The black pixels 604*b* are randomly dispersed throughout the display 602. This is due to the random nature with which the pixels 604*a*, 604*b* are applied to the display screen 602.

The calibration optical signal 608 is instigated by the calibration component and transported to the pixels 604*a*, 604*b* of the display via the optical waveguide 104.

The calibration optical signal 608 addresses a single pixel 606 of the display. The location of the pixel 606 is unknown prior to transmittal of the calibration optical signal 608.

The calibration optical signal 608 also comprises control data, which, when implemented, controls the state of the pixel 606. In this example, the control data in the calibration optical signal 608 defines the state of the pixel 606 to be black.

Prior to receiving the calibration optical signal 608 which addresses the pixel 606, the pixel 606 is white, as shown in the left-hand display screen 602. Every pixel 604*a*, 604*b* of the display screen 602 receives the calibration optical signal 608. The pixels 604*a*, 604*b* then convert the calibration optical signal 608 into a corresponding calibration electric signal, comprising address bits and control bits. As described above with reference to the data signals, the calibration electrical signal is implemented by the pixel 606 which has the matching pixel address.

In the example of FIG. 6, the pixel 606 has the pixel address matching the address bits of the calibration electrical signal, and, as such, implements the control bit to change state from white to black, as shown in the right-hand display screen 602.

Once the calibration signal has been implemented, an external imaging device, such as a camera, captures an image of the display screen 602. The image is received by the calibration component, which processes the image to determine the response of each pixel 604*a*, 604*b* to the calibration signal. It may, for example, compare the image to an image captured prior to the instigation of the calibration optical signal 608. The location of the pixel 606 which has implemented the command sent in the calibration optical signal 608, that is, the pixel 606 which has changed state from white to black, is determined. The address of the pixel 606 is known from the address bits in the calibration electrical signal.

The location of the pixel 606 is stored in association with the pixel address to which the pixel 606 responded, that is the pixel address as defined in the address bits of the calibration electrical signal corresponding to the calibration optical signal 608.

It will be appreciated that, although a binary type display has been used in the example of FIG. 6, a non-binary type display can also be calibrated by the method set out above. For a non-binary type display, multiple calibration optical signals may be implemented prior to the image capture step, with each calibration optical signal defining a different colour for the address pixel to emit, such that each state change can be associated with the signal it was affected by. The image captured of the display can be processed to determine the location of each pixel emitting each different colour, and matching the pixel address to which the command to emit each colour was sent to the determined location of each pixel emitting each colour.

It will be appreciated that not all tested pixel addresses will result in a state change of a pixel 604*a*, 604*b* of the display 602. This is because there may not be as many pixels 604*a*, 604*b* of the display screen 602 as there are possible pixel addresses.

An alternative method for determining the location of the pixels and their associated pixel addresses is by way of triangulation.

For example, the display system comprises two or more triangulation sensors 610*a*, 610*b* which are coupled to the optical waveguide 104.

After the calibration optical signal 608 has been received by the pixels 604*a*, 604*b* of the display screen 602, the addressed pixel 606 changes state and emits or reflects light. The emitted or reflected light propagates through the optical waveguide 104 such that some of the propagated light, also referred to as triangulation signals, is detected by the triangulation sensors 610*a*, 610*b*.

Based on the detected triangulation signals, the calibration component determines the location of the pixel 606 from which the light was emitted or reflected. The calibration component stores the determined location in association with the pixel address as defined in the calibration signal 608.

The associated pixel locations and pixel addresses are stored in a memory.

The in-situ calibration process only needs to be performed once since the mapping between the pixel addresses and the physical location of the pixels 102 on the display are stored.

The stored pixel locations are used to control the display. An image to be rendered on the display is defined. The address of each pixel 102 is found from the lookup table for each location of the image to be displayed. Data packets for each pixel 102 are generated which identify the pixel 102 and define the desired state of the pixel 102 based on its location in the display screen in comparison to the image to be displayed. The data packets are then used to generate the multiplexed optical signals 114 by the display controllers for transmitting to the pixels 102.

The multiplexed optical signals 114 may enter the optical waveguide 104 from the side, as illustrated in FIG. 1.

In large displays with multiple display controllers, as discussed above, the display controllers may not transmit all signals which are to be received by the pixels 102. For example, a display controller may be responsible for transmitting signals to only the pixels which are located within a predefined area relative to the display controller. As such, multiple display controllers can send different signals simultaneously. In such an embodiment, the transmitters must be positioned far enough apart that there is no significant signal interference between signals transmitted from the different display controllers.

As discussed above, there may be more than one pixel 102 per display associated with a single unique pixel address. This may result in discrepancies between the displayed image and the image intended to be displayed. Other causes for such discrepancies include manufacturing defects in the display, such as faulty or otherwise damaged pixels 102.

The discrepancies can be accounted for via image processing. From the results of the calibration, it is known if any two or more pixels 102 have the same pixel address. It is also known if there is a location at which a pixel 102 does not function as intended, for example if there is a pixel 102 which did not respond to any calibration signals. The image to be displayed can, therefore, be adjusted to avoid these defects in the display from being visible.

The display screen comprises an image processing component to compensate for any discrepancies in the display screen. The image to be rendered is received by the image processing component. The image processing component accesses a memory in which the associated pixel locations and addresses are stored. It identifies if there are any two or more pixels of the display screen which are assigned the same pixel address. If it is found that there are two or more pixels which share a pixel address, the image processing component determines based on the received image to be rendered, if these pixels are to render different colours. If it is found that the pixels with matching addresses are to render different colours, the image to be rendered is transformed.

The image to be rendered may be transformed via any image processing means. The image is transformed such that the pixels with matching addresses are required to render the same colour.

The image to be displayed may, for example, be shifted, resized, or rotated such that the defect is not noticeable in the displayed image, i.e. the pixels with matching pixel addresses emit the same colour light.

Alternatively, the image may be modified to include a concealing element. For example, the colour to be emitted by the surrounding pixels may be altered so that the pixel emitting the colour which is different from that defined by the image to be rendered is less noticeable. This may be achieved by using a fading effect, whereby the nearby pixels create a fade from the colour incorrectly emitted by the pixel to the colour emitted by the surrounding pixels.

In some instances, the image processing component may determine that the defects in the displayed image which will be caused by the discrepancies in the display screen are allowable. That is, the defects in the displayed image do not cause excessive image degradation. Rules may be defined which determine if the degradation is allowable. For example, there may be a predefined range of colours centred around the wavelength which is intended to be emitted by that pixel based on the image to be displayed, and if the pixel emits a wavelength within the range it is deemed to not degrade the image to an extent which requires image processing. Other rules may be implemented, such as a maximum number of defective pixels in a given area. If the degradation of the image is deemed allowable, no image processing is implemented.

Code-Division Multiple Access (CDMA) may be used to increase the display's robustness to noise. This may be beneficial in displays with multiple transmitters or in displays exhibiting defects.

CDMA may be used as an alternative addressing system to that described above. That is, the data or calibration signals may not comprise an addressing portion, but instead these signals identify their intended pixel 102 using CDMA.

According to a first aspect of the present disclosure, there is provided a display screen configurable via optical signals to display an image, the display screen formed of an optical waveguide having a display surface and supporting a plurality of pixels for displaying the image on the display surface of the optical waveguide, the optical waveguide arranged to guide a multiplexed signal in optical form to a plurality of pixel controllers, each coupled to at least one of the pixels and configured to demultiplex the multiplexed signal and thereby extract a component signal associated with the at least one pixel for controlling it to render an element of the image.

Each pixel of the plurality of pixels may have an assigned pixel address, the plurality of pixels being randomly arranged in that each pixel address is independent of the pixel's location.

The optical waveguide may be formed of a flexible polymer and/or the display surface is curved.

The display screen may comprise one or more power converters for drawing power from the optical signals to power the pixels.

The component signals of the multiplexed signal may be time-modulated on a common wavelength carrier and each may comprise an address portion and a control portion, each pixel controller configured to demultiplex the multiplexed signal by comparing the address portion with an address of the pixel, and control the pixel to implement the control portion only if the address portion matches the address of the pixel.

The multiplexed optical signal may also carry a clock signal on a different wavelength and each pixel controller is configured to use the clock signal to extract the component signal.

The multiplexed signal may also carry a post signal which each pixel processor is configured to use in order to distinguish the address portion for the control portion.

The component signals may be code multiplexed, each pixel controller configured to extract the component signal using an address of the pixel as a demultiplexing code.

According to a second aspect of the present disclosure, there is provided a display system comprising: the display screen as described above; an input configured to receive an image to be rendered; and a display controller coupled to the optical waveguide of the display screen and configured to generate a multiplexed signal in optical form to cause the display screen to display the received image or a version of the received image.

The display system may be configured as described above, the display system may also comprise an image processing component, the image processing component configured to: accesses a memory in which assigned addresses of the pixels are stored; identify any two or more pixels of the display screen which have the same pixel address; based on the received image to be rendered, determine if the two or more pixels with the same assigned pixel address are required to render different colours; and if it is determined that the two or more pixels are required to render different colours, compile a transformed version of the image using image processing applied to the image such that the two or more pixels are no longer required to render different colours, the display controller configured to cause the display screen to display the transformed version of the image.

The display system may also comprise: two or more sensors coupled to the optical waveguide for detecting light emission or reflection from each pixel propagating through the waveguide to the sensors; and a calibration component configured to instigate a calibration optical signal to the pixels, the calibration signal for testing a response of the pixels to different pixel addresses, and determine a location of each pixel by signals detected at the one or more sensors in response to the pixel changing its emissive or reflective properties, and to store the location of each pixel in a memory with a pixel address to which that pixel responded.

The two or more sensors may comprise time-of-flight sensors.

The two or more sensors may comprise triangulation sensors.

The display system may also comprise a calibration component configured to: instigate a calibration optical signal to the pixels, the calibration signal for testing a response of the pixels to different pixel addresses; receive at least one externally captured image of the display screen; process the received image to determine a response of each pixel to the calibration signal, and thereby determine an address and a location of the pixel; and store the location of the pixel in association with the pixel address to which it responded.

According to a third aspect of the present disclosure, there is provided a method of displaying an image on a display screen, the display screen formed of an optical waveguide having a display surface and supporting a plurality of pixels for displaying the image on the display surface of the optical waveguide, the method comprising: guiding a multiplexed signal in optical form to a plurality of pixel controllers, each coupled to at least one of the pixels, via the optical waveguide; demultiplexing the multiplexed signal by the plurality of pixel controllers to extract a component signal associated with the at least one pixel; and rendering an element of the image at the at least one pixel, the element defined by a control portion of the component signal.

It will be understood that any processor, controller and the like referred to herein may in practice be provided by a single chip or integrated circuit or plural chips or integrated circuits, optionally provided as a chipset, an application-specific integrated circuit (ASIC), field-programmable gate array (FPGA), central processing unit (CPU), microcontroller etc. It will be appreciated that the above embodiments have been described by way of example only. Other variants or use cases of the disclosed techniques may become apparent to the person skilled in the art once given the disclosure herein. The scope of the disclosure is not limited by the described embodiments but only by the accompanying claims.

The invention claimed is:

1. A display system comprising:

a display screen configurable via optical signals to display an image, the display screen formed of an optical waveguide having a display surface and supporting a plurality of pixels for displaying the image on the display surface of the optical waveguide, each pixel of the plurality of pixels has an assigned pixel address, the plurality of pixels being randomly arranged in that each pixel address is independent of the pixel's location, the optical waveguide arranged to guide a multiplexed signal in optical form to a plurality of pixel controllers, each coupled to at least one of the pixels and configured to demultiplex the multiplexed signal and thereby extract a component signal associated with the at least one pixel for controlling it to render an element of the image;

an input configured to receive an image to be rendered;

an image processing component, the image processing component configured to:

access a memory in which assigned addresses of the pixels are stored associated with the locations of the pixels on the display screen, the location of each pixel determined in a calibration process;

identify any two or more pixels of the display screen which have the same pixel address;

based on the received image to be rendered, determine if the two or more pixels with the same assigned pixel address are required to render different colours; and if it is determined that the two or more pixels are required to render different colours:

compile a transformed version of the image using image processing applied to the image such that the two or more pixels are no longer required to render different colours;

wherein a display controller is configured to generate a multiplexed signal in optical form to cause the display screen to display the transformed version of the image.

2. The display system of claim 1, wherein the optical waveguide is formed of a flexible polymer, the display surface is curved, or both.

3. The display system according to claim 1, wherein the display screen comprises one or more power converters for drawing power from the optical signals to power the pixels.

4. The display system according to claim 1, wherein the component signals of the multiplexed signal are time-modulated on a common wavelength carrier and each comprises an address portion and a control portion, each pixel controller configured to demultiplex the multiplexed signal by comparing the address portion with an address of the pixel, and control the pixel to implement the control portion only if the address portion matches the address of the pixel.

5. The display system according to claim 4, wherein the multiplexed optical signal also carries:

a clock signal on a different wavelength and each pixel controller is configured to use the clock signal to extract the component signal.

6. The display system according to claim 5, wherein the multiplexed signal also carries a post signal which each pixel processor is configured to use in order to distinguish the address portion for the control portion.

7. The display system according to claim 1, wherein the component signals are code multiplexed, each pixel controller configured to extract the component signal using an address of the pixel as a demultiplexing code.

8. The display system according to claim 1, wherein the display system also comprises:

two or more sensors coupled to the optical waveguide for detecting light emission or reflection from each pixel propagating through the waveguide to the sensors; and a calibration component configured to instigate a calibration optical signal to the pixels, the calibration signal for testing a response of the pixels to different pixel addresses, and determine a location of each pixel by signals detected at the one or more sensors in response to the pixel changing its emissive or reflective properties, and to store the location of each pixel in a memory with a pixel address to which that pixel responded.

9. The display system according to claim 8, wherein the two or more sensors comprise time-of-flight sensors.

10. The display system according to claim 8, wherein the two or more sensors comprise triangulation sensors.

11. The display system according to claim 1, wherein the display system also comprises a calibration component configured to:

instigate a calibration optical signal to the pixels, the calibration signal for testing a response of the pixels to different pixel addresses;

receive at least one externally captured image of the display screen;

process the received image to determine a response of each pixel to the calibration signal, and thereby determine an address and a location of the pixel; and store the location of the pixel in association with the pixel address to which it responded.

12. A method of displaying an image on a display screen, the display screen formed of an optical waveguide having a display surface and supporting a plurality of pixels for displaying the image on the display surface of the optical waveguide, each pixel of the plurality of pixels has an assigned pixel address, the plurality of pixels being randomly arranged in that each pixel address is independent of the pixel's location, the method comprising:

receiving an image to be rendered;

accessing a memory in which assigned addresses of the pixels are stored associated with the locations of the pixels on the display screen, the location of each pixel determined in a calibration process;

identifying any two or more pixels of the display screen which have the same pixel address;

based on the received image to be rendered, determining if the two or more pixels with the same assigned pixel address are required to render different colours;

if it is determined that the two or more pixels are required to render different colours:

compiling a transformed version of the image using image processing applied to the image such that the two or more pixels are no longer required to render different colours;

generating a multiplexed signal in optical form to cause the display screen to display the transformed image;

guiding the multiplexed signal in optical form to a plurality of pixel controllers, each coupled to at least one of the pixels, via the optical waveguide;

demultiplexing the multiplexed signal by the plurality of pixel controllers to extract a component signal associated with the at least one pixel; and rendering an element of the image at the at least one pixel, the element defined by a control portion of the component signal.

13. The method of claim 12, wherein the optical waveguide is formed of a flexible polymer, the display surface is curved, or both.

14. The method of claim 12, wherein the display screen comprises a power converter drawing power from the optical signals to power the pixels.

15. The method of claim 12, wherein the component signals of the multiplexed signal are time-modulated on a common wavelength carrier and each of the component signals comprises an address portion and a control portion, each pixel controller configured to demultiplex the multiplexed signal including comparing the address portion with an address of the pixel, and to control the pixel to implement the control portion based on the address portion matching the address of the pixel.

16. A display screen formed of an optical waveguide having a display surface and supporting a first pixel and a second pixel for displaying an image on the display surface of the optical waveguide, the first pixel and the second pixel having an assigned pixel address, the first pixel and the second pixel being randomly arranged in that each pixel address is independent of the pixel's location, the display screen configured to perform operations of:

- receiving an image to be rendered;
- accessing a memory in which assigned addresses of the first pixel and the second pixel are stored associated with the locations of the first pixel and the second pixel on the display screen, the location of each pixel determined in a calibration process;
- identifying the first pixel and the second pixel having the same pixel address;
- based on the received image to be rendered, determining if the first pixel and the second pixel are required to render different colours;
- if it is determined that the first pixel and the second pixel are required to render different colours:
  - compiling a transformed version of the image using image processing applied to the image such that the first pixel and the second pixel are no longer required to render different colours;
  - generating a multiplexed signal in optical form to cause the display screen to display the transformed image;
- guiding the multiplexed signal in optical form to a pixel controller coupled to the first pixel, via the optical waveguide;
- demultiplexing the multiplexed signal by the pixel controller including extracting a component signal associated with the first pixel; and
- rendering an element of the image at the first pixel, the element defined by a control portion of the component signal.

17. The display screen of claim 16, wherein the optical waveguide is formed of a flexible polymer, the display surface is curved, or both.

18. The display screen of claim 16, wherein the display screen comprises a power converter drawing power from the optical signal to power the first pixel and the second pixel.

19. The display screen of claim 16, wherein the component signal of the multiplexed signal is time-modulated on a common wavelength carrier, wherein the component signal comprises an address portion and a control portion, the pixel controller being configured to demultiplex the multiplexed signal including comparing the address portion with an address of the first pixel, and to control the first pixel to implement the control portion based on the address portion matching the address of the first pixel.

20. The display screen of claim 19, wherein the multiplexed optical signal further carries:

- a clock signal on a different wavelength and the pixel controller is configured to use the clock signal to extract the component signal.

* * * * *